Figure 1:
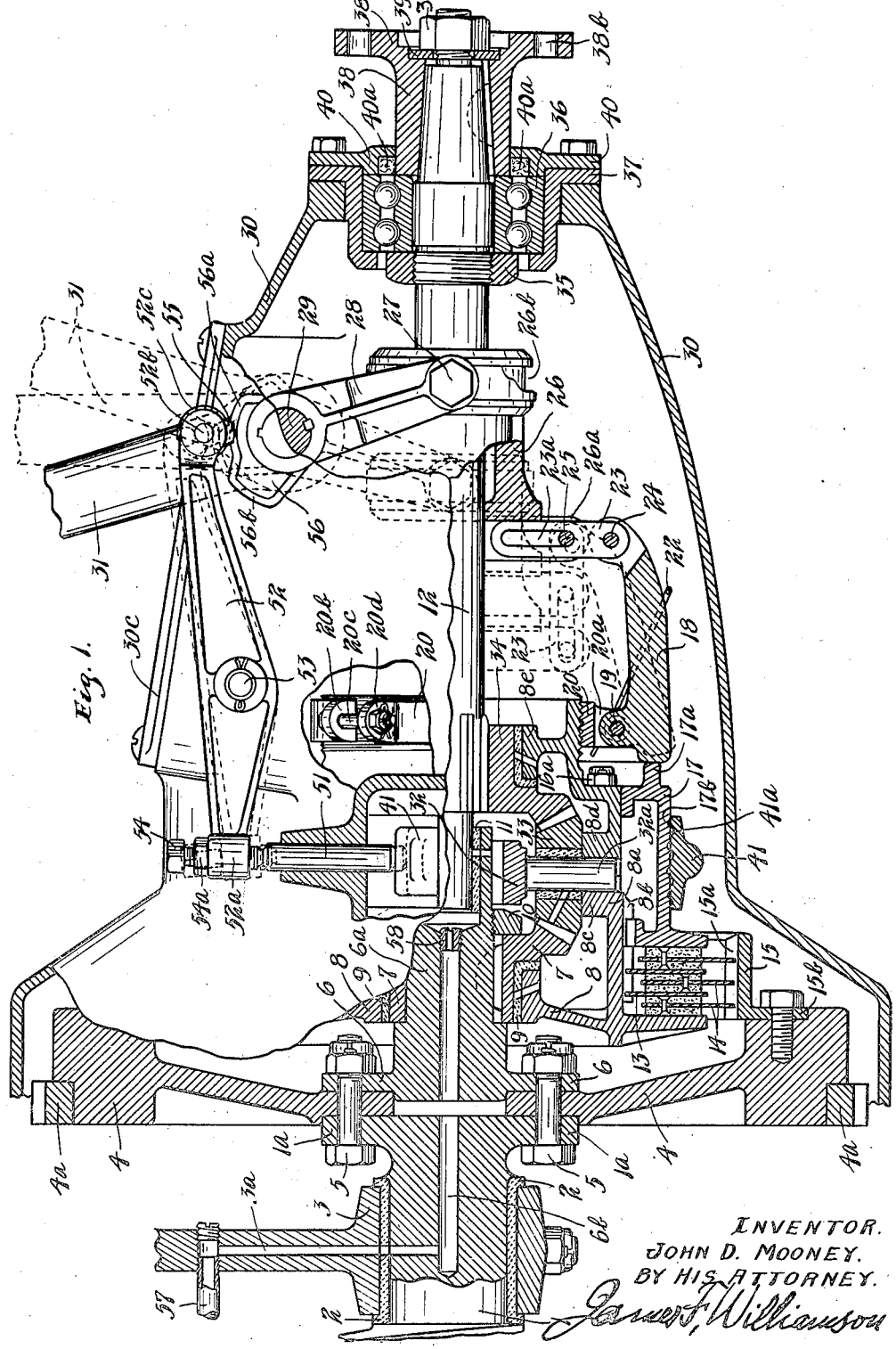

Feb. 2, 1926. 1,571,210
J. D. MOONEY
MARINE ENGINE COMBINED REVERSING GEAR AND CLUTCH.
Filed Feb. 7, 1924 2 Sheets-Sheet 2

INVENTOR.
JOHN D. MOONEY.
BY HIS ATTORNEY.
James F. Williamson

Patented Feb. 2, 1926.

1,571,210

UNITED STATES PATENT OFFICE.

JOHN D. MOONEY, OF ST. PAUL, MINNESOTA.

MARINE-ENGINE COMBINED REVERSING GEAR AND CLUTCH.

Application filed February 7, 1924. Serial No. 691,272.

*To all whom it may concern:*

Be it known that I, JOHN D. MOONEY, a citizen of the United States, residing at St. Paul, in the county of Ramsey and State of Minnesota, have invented certain new and useful Improvements in Marine-Engine Combined Reversing Gears and Clutches; and I do hereby declare the following to be a full, clear, and exact description of the invention, such as will enable others skilled in the art to which it appertains to make and use the same.

This invention relates to a driving and reversing gear and clutch, and while the invention is applicable for driving any members where certain speeds are desired, the same is particularly designed for use as a marine driving mechanism and clutch. Such driving and reversing mechanism are usually interposed between the motor and the propeller of a boat.

It is an object of this invention to provide a simple and compact driving and reversing mechanism by means of which the motor can readily be disconnected from the propeller or the mechanism placed in neutral position, in which the motor can readily be connected to the propeller directly to drive the same and where the propeller can readily be driven in a reverse direction by the motor and preferably at the same speed as the motor.

It is a further object of the invention to provide such a driving mechanism including a clutch comprising a series of annular clutch disks rotatably but laterally slidably connected to the driving member, which disks are respectively disposed between and overlapped with a series of annular disks rotatably, but laterally slidably connected to the driven member.

It is another object of the invention to provide such a mechanism comprising a driving member, a beveled gear secured thereto, a driven member carrying a freely revoluble beveled pinion meshing with said gear and another beveled gear meshing with said pinion, said latter gear being secured to a driven shaft, together with means for revolving the driven member with the driving member to drive the said shaft by the bodily rotation of the pinion, and means for holding the driven member stationary whereby the shaft is turned in a reverse direction by the rotation of said gears and pinion about their respective axes.

It is a further object of the invention to provide such a mechanism having an operating lever movable to three positions, in one of which the motor or driving member and the driven or propeller shaft are disconnected and in another of which positions the driving member and driven shaft are directly connected, said lever, in this third position having means by which the driven shaft is made to turn in a reverse direction.

Figure 2:
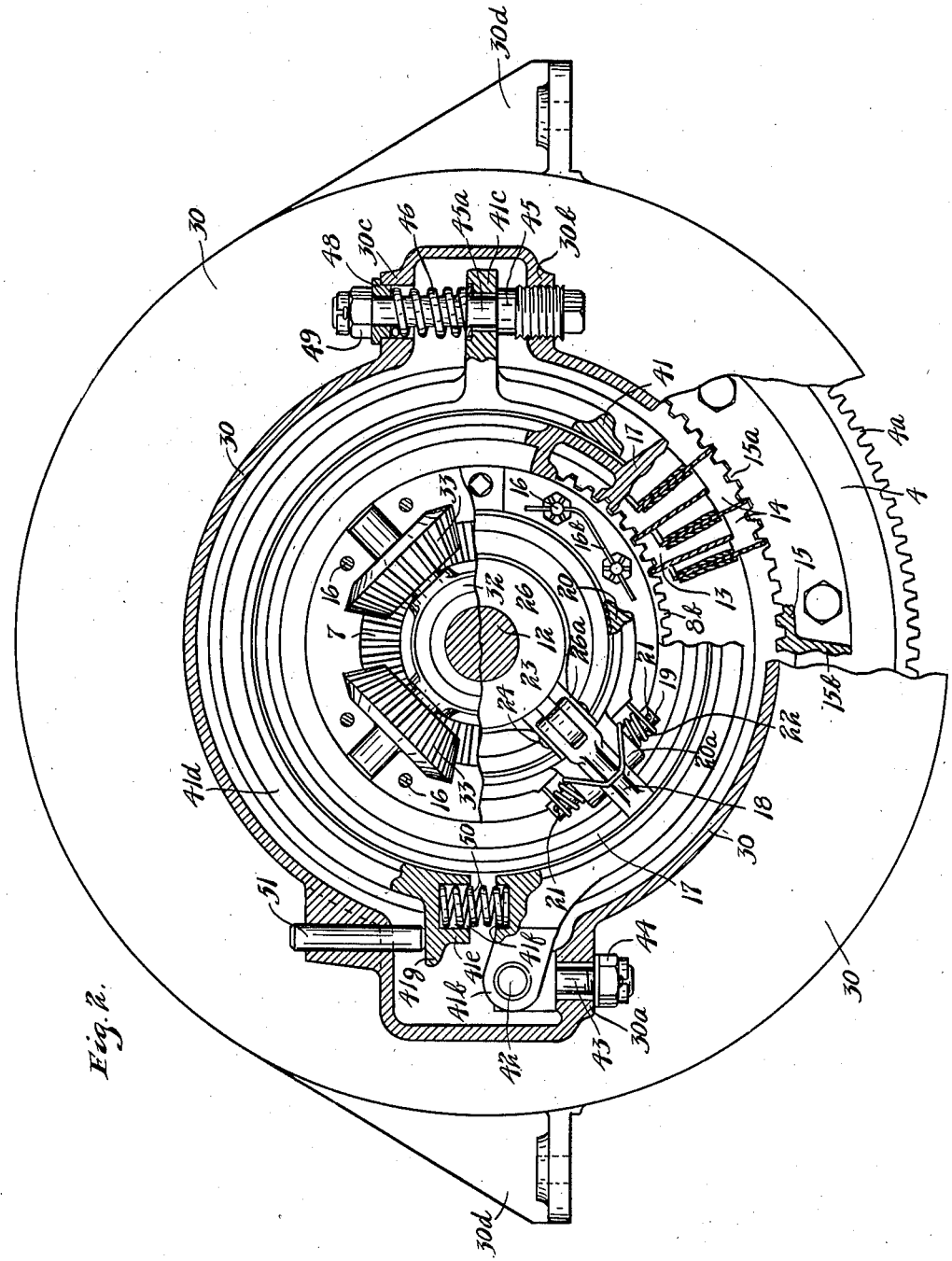

These and other objects and advantages of the invention will be fully set forth in the following description made in connection with the accompanying drawings in which like reference characters refer to the same parts throughout the different views, and in which, Fig. 1 is a view principally in central vertical section through the mechanism, certain parts being shown in side elevation; and Fig. 2 is a view partly in end elevation, as seen from the left of Fig. 1, and partly in vertical section.

Referring to the drawings, a portion of a crank shaft of a motor is indicated as 1 journaled in a bushing 2 supported in bearings 3 forming part of the motor frame or casing. While any type of driving member can be connected to the motor shaft, in the embodiment of the invention illustrated, the same is shown as having a flange 1ª at the end thereof to which is bolted a fly wheel 4. This fly wheel 4 is connected to said flange by the headed and nutted bolts 5 which also pass through and secure the said fly wheel to member 6 having a centrally projecting portion 6ª. The fly wheel 4 is shown as having a gear 4ª secured to its outer edge adapted to operate an electric starter and which has no connection with the present invention. The projecting portion 6ª of the member 6 has a beveled gear 7 secured thereto, as by the key shown, and a driven member 8 is journaled on the hub of said beveled gear and has therein the bushing 9, said member 8 thus being freely revoluble about the hub of gear 7 and the member 6. A nut 10 is threaded onto the projection 6ª and holds the beveled gear thereon a shoulder being formed on the projection, against which the gear seats. The projection 6ª is continued beyond the nut 10 and bored to receive a bushing 11 in which the end of a shaft 12 is journaled, which shaft will be later described. The member 8 has a cylindrical portion 8ª on the outer peripheral portion of which are formed circumferentially spaced ribs or splines 8^b. A plurality of friction disks 13 of annular form surround the portion 8^a and are provided with circumferentially spaced notches fitting, respectively, over the ribs 8^b whereby said disks are rotatively fixed relative to the member 8 but are slidable laterally thereon. A plurality or series of annular disks 14 are arranged, respectively, at each side of the disks 13 and therebetween, the disks 14 being of larger diameter than the disks 13 and overlapping the latter for the greater portion of their areas. The disks 14 are provied at their outer peripheries with circumferentially spaced notches adapted to fit over, respectively, circumferentially spaced splines or ribs 15^a formed on the interior surface of a cylindrical member 15 having an outwardly projecting flange 15^b by which it is bolted to the fly wheel 4. The disks 14 are thus rotatively fixed relative to the member 15 and fly wheel 4 but are laterally slidable in the member 15. The portion 8^a of member 8 has formed on its interior and projecting inwardly therefrom, a series of hubs or bosses 8^c, said member and bosses being split for the purpose of assembly, thus forming, in effect, a cap bearing, the other portion 8^d of which is bolted to the portion 8^a by the bolts 16, the portion 8^d thus forming a continuation of and being rigid with the part 8^a of member 8. The studs 16 are shown as provided with castle nuts 16^a which may be held in place by a wire 16^b engaging grooves in the tops thereof. A member 17 of cylindrical form fits over the outer periphery of the member 8^d and has an inwardly directed flange formed with circumferentially spaced notches adapted to fit over the ribs or splines 8^b, the end of said member adjacent said notches being of considerable area and contacting the outer one of disks 14. While the disks 13 and 14 may be of any suitable friction material, in the embodiment of the invention illustrated, one set thereof, shown as the set 14, is formed of thin metal sheets having riveted at each side thereof disks of friction fiber, the disks 13 projecting between these fibrous disks. The member 17 is adapted to be reciprocated on members 8 and 8^d parallel to the axis thereof and has an outwardly projecting flange 17^a adapted to be engaged by the end of levers 18, which levers are pivoted to the pins 19 extending through lugs thereon and through spaced arms or lugs 20^a projecting outwardly from a ring 20 which is threaded onto the end of the member 8^d. Ring 20 is adjustable on member 8^d and is split and provided with lugs 20^b and 20^c receiving a bolt 20^d adapted to clamp said ring in adjusted position. Levers 18 can thus be positioned to effect the desired pressure between disks 14 and 13, through members 17. The pin 19 receives cotter pins 21 between which and the lugs 20^a are coiled the ends of a torsion spring 22. The central portion of said spring extends over the outer side of the lever 18 and the ends thereof are held beneath the edge of the ring 20. The spring 22 normally is under tension to swing the lever 18 to the position shown in dotted lines in Fig. 1. The end of lever 18 opposite the flange 17^a is bifurcated to receive the outer end of a link 23 connected thereto by a suitable bolt or rivet 24.

The link 23 has a slot 23^a of considerable length therein extending adjacent its other end in which is disposed a pin 25. Pin 25 extends through outwardly projecting lugs 26^a carried by a clutch collar 26 slidable on the shaft 12 and said pin will be headed at the outer sides of said lugs, as shown in Fig. 2. There is a plurality of the levers 18 and their connected parts circumferentially spaced about the shaft 12 and preferably there will be three of such levers, only one of which is shown in the drawings. Studs 27 carried in the sides of a yoke 28 secured to a shaft 29 project into a groove 26^b in collar 26. Shaft 29 is journaled in bearings formed in the casing 30 surrounding the transmission mechanism, which casing will be later described.

The shaft 29 is turned by a hand lever 31 disposed at one side of the casing and a portion only of which is illustrated. The lever 31 and collar 26, together with its lugs 26^a, are movable to three positions, as indicated by the dotted lines in Fig. 1, and it will be noted that the lugs 26^a with the links 23 form, in effect a toggle joint.

There will be a plurality of hubs 8^c, preferably four in number, as illustrated, and these hubs have fixed therein shafts or pintles 32^a projecting from a central ring 32, which ring surrounds the outer end of hub 6^a. Journaled on each of the shafts 32^a is a beveled pinion 33 having a suitable bushing therein, which pinion meshes with the gear 7. The member 8^d is formed at one end within the threaded end thereof with a hub 8^e provided with a suitable bushing in which is mounted a beveled gear 34 which meshes, in turn, with the pinions 33. The beveled gear 34 is secured, as by a key shown, to the shaft 12. The shaft 12 at its outer end, has threaded thereon a thrust collar 35 bearing against the ball bearing casing 36, said casing being carried in a cup 37 seated in a bore in the end of casing 30. The outer end of the shaft 12 is tapered and has keyed and secured thereon a member 38 having an outwardly projecting flange 38^a, which member is secured to and held tight on the shaft by the nut 39 threaded on the end of the shaft and bearing against a washer 39^a seated in a recess in the member 38. The flange 38^a is provided with suitable bolt holes 38$^b$ so that the propeller structure can be bolted thereto. It may be stated that the casing 30, as shown, extends entirely about the shaft 12 and parts mounted thereon as well as about the fly wheel 4 and will be suitably connected to the engine casing or frame of the boat by means of the lugs 30$^d$. It will also be noted that the casing is provided with a removable cover 30$^e$ secured to a flange at its top portion to afford access to said casing for adjustment or other purposes. A cap or gland member 40 is bolted to the outer end of the cup 37 and casing 30 and carries packing material 40$^a$ adapted to contact the outer end of the ball casing 36 and the inner end of member 38.

The member 17 is embraced by a member 41 fitting the cylindrical periphery thereof, and said periphery is provided with a series of small helical grooves 17$^b$. The inner surface of member 41 is likewise provided with a series of helical grooves 41$^a$ preferably arranged in staggered relation with the grooves 17$^b$. As shown in Fig. 2, member 41 is in the form of a split ring, one end of which is provided with a lug 41$^b$ pivoted by a pin 42 to the head of a stud 43 extending downwardly through an opening in the hub 30$^a$ formed on a lateral extension of the casing 30, said stud being provided with a suitable crown nut 44 held in place, as usual, by a cotter pin. At the side of ring 41 substantially opposite the lug 41$^b$, said ring has a projecting arm or tongue 41$^c$ seated on a headed stud 45 threaded into a hub 30$^b$ at one side of an enlarged portion of casing 30. Said stud inwardly of the hub 30$^b$ has a reduced shoulder forming portion 45$^a$ passing through the arm 41$^c$, which arm seats on the shoulder formed thereby and is pressed thereagainst by a coiled spring 46 bearing against the washer 47 set into a recess in said arm and at its other end against a plug 48 having a flange bearing on the outer end of a hub 30$^c$ opposite hub 30$^b$ and projecting thereinto. The plug 48 is held in place by a crown nut 49 secured to the threaded end of the nut 45 in the usual manner. One portion of ring 41 which carries the lug 41$^b$ thus forms substantially half of said ring extending from the arms 41$^c$ and the portion 41$^d$ extends in the opposite direction from the arm 41$^c$ to a point adjacent the lug 41$^b$, said portions being formed with recesses 41$^e$ and 41$^f$, respectively, in which are seated the ends of a compression spring 50. The end of portion 41$^d$ has a flat surfaced lip 41$^g$ opposite its recess 41$^e$ against which bears a pin 51 slidable in the casing 30. As shown in Fig. 2, the ring 41 normally is slightly spaced from the periphery of member 17 but said ring is adapted to be brought into clamping engagement with the member 17, as shown in Fig. 1. This engagement is effected by a lever 52 intermediately pivoted on a pin 53 secured in a suitable hub on casing 30 having a hub 52$^a$ at one end through which passes an adjustable set screw 54 having thereon a suitable jamb nut 54$^a$. The inner end of the set screw 54 alines with the outer end of pin 51. The other end of lever 52 is bifurcated and has journaled therein on pin 52$^b$ a cam roller 52$^c$ adapted to be moved by a cam 56. A tongue 55 on lever 52 projects into a groove 56$^a$ in said cam to afford a guiding and alining means.

An oil supply pipe 57 extending from the motor oiling system is shown communicating with a passage 3$^a$ in the member 3 which, in turn, leads to a central oil passage 6$^b$ in member 6, a plug 58 being inserted in the end of said latter passage but having a small aperture therethrough by means of which oil is conveyed to the bushing 11. The casing 30 is made liquid tight and the parts therein run in oil.

The transmission mechanism is designed to have three positions, namely, a forward driving position in which the shaft 12 and propeller will be driven at the same speed as the motor shaft 1, a neutral position in which the shaft 12 will not be driven by the rotating motor shaft and a reverse position in which shaft 12 will be driven in a reverse position to the motor shaft and at the same speed as the motor shaft. In Fig. 1, the parts are shown in full lines as in the first position mentioned. The member 31 is swung to move the collar 26 to bring the link 23 into substantially vertical position, the side of the link, as shown, contacting the end of said collar. With the link in this position the end thereof forces outwardly the end of lever 18 and the end of said lever is swung against the flange 17$^a$ of member 17. This forces member 17 endwise and presses the disks 13 and 14 together. Assuming that the motor shaft is rotating, fly wheel 4 and member 15 will thus rotate therewith. The disks 14 are thus rotated with the motor shaft as are members 4 and 15. By pressing the plurality of disks together a great friction is obtained and the disks 13 are rotated with the disks 14 and the disks 13, in turn, drive the member 8 by engagement with the ribs 8$^b$. The member 8, with its attached member 8$^d$ and the members 17 and 18 thus all rotate about shaft 12 as a unit. As the members 8 and 8$^d$ carry the pinions 33, these pinions, likewise, are carried bodily about the axis of shafts 1 and 12 and will rotate the gears 7 and 34. Shaft 12 is thus driven by gear 34 which is secured thereto and said shaft 12 is rotated at the same speed as motor shaft 1 and is directly connected thereto. The propeller attached to shaft 12 will thus be driven at the same speed as the motor shaft and this will be the forward speed of the device.

To move the mechanism into neutral position, the lever 31 will be swung to the middle position shown in dotted lines in Fig. 1. This will move collar 26 inwardly on shaft 12 and the link 23 will be swung downwardly substantially into horizontal position, as shown in dotted lines in Fig. 1, the toggle formed by link 23 and lugs 26ª thus being broken. This results in swinging the end of lever 18 connected to the link inwardly so that the other end of said lever swings out of alinement with flange 17ª. This releases the member 17 and the disks 13 and 14 and the same immediately separate, owing to the load so that member 8 is no longer driven through the disks by fly wheel 4 and motor shaft 1. The member 6, however, is driven by the fly wheel being bolted thereto and this member will turn gear 7 which meshes with gear 33. Gear 33 will be rotated therefore, but owing to the load on the gear 34 due to the propeller, gear 34 will not be turned and the pinions 33 will merely traverse about the gear 34 as in an ordinary planetary gear construction, members 8 and 8ᵈ rotating together with members 17 and 18, member 8ᵈ turning about its bearing on the gear 34. Shaft 12 thus remains stationary and motor shaft 1 revolves without turning the same. This is the neutral position.

To affect a reverse position, lever 31 is swung to the dotted line position shown at the right in Fig. 1. This moves collar 26 farther inwardly, as shown in dotted lines in Fig. 1, pin 25 in this movement merely moving forwardly in the slot 23ª which with the link 23 remains in horizontal position. During this movement, however, roller 52ᵇ rides up on the high part 56ᵇ of cam 56 so that lever 52 is swung about its pivot, as indicated by the dotted lines in Fig. 1, and pin 51 is forced inwardly by the set screw 53. This inward movement of pin 51 presses together the portions of ring 41 against the spring 50 and ring 41 is clamped about member 17 and acts as a brake to hold said member against rotation, ring 41, of course, being held stationary by its attachment to casing 30. The member 17 therefore cannot rotate and pinions 33 cannot be carried bodily about the center of the mechanism. Gear 7 is driven from the motor shaft and fly wheel 4 and the pinions 33 must thus rotate about their axes and drive gear 34 about its axis. This rotation of the gear 34 will drive shaft 12 to which said gear is secured and said shaft will be driven in a reverse direction to the motor shaft. A reverse drive of shaft 12 is thus affected at the same speed as shaft 1. The ring 41 is formed as shown and described, in order that it may always be adjusted so as to be disposed centrally coaxially with the member 17. It will be seen that by adjusting the position of arm 41ᶜ by means of a stud 45 that the portions of ring 41 may always be kept centrally disposed about the member 17 so that uniform and efficient braking action will be obtained when the ring is compressed by the pin 51. The casing 30 will be made oil tight and the mechanism will run in oil. There will thus always be a considerable film of oil about the periphery of member 17. This oil will be squeezed out when ring 41 is clamped to member 17 and will be forced into the grooves 41ª and 17ᵇ. These grooves are given a pitch or made helical and the pitch is so arranged that there will be some tendency to move member 17 away from the disks 14 when the brake ring 41 is applied. The number of disks 13 and 14 is varied with the size of the motor and said disks may be multiplied, as desired, to obtain the desired transmitting power.

From the above description it is seen that applicant has provided a simple, compact and efficient driving mechanism capable of securing the desired speeds. The mechanism is easily produced, installed and operated and requires practically no attention for maintenance after once being put into operation. The mechanism has been amply demonstrated in actual practice and found to be very successful and efficient and is being made and used today commercially in large numbers.

It will, of course, be understood, that various changes may be made in the form, details, arrangement and proportion of the parts without departing from the scope of applicant's invention, which, generally stated, consists in a device capable of carrying out the objects above stated, such as shown, described and set forth in the appended claim.

What is claimed is:

1. A driving mechanism having in combination, a driving member having a gear secured thereto, a driven member having a gear secured thereto, a member co-axial with said members and surrounding the same and circumferentially spaced from said driving member and carrying a plurality of planetary gears meshing with both said gears, a plurality of friction disks between said last mentioned member and said driving member, alternate disks engaging one of said members at their inner edges and the other disks engaging the other member at their outer edges, said disks being slidable axially into contact with said driving member, a brake drum mounted for axial sliding movement on said last mentioned member arranged to press said disks together to connect said last mentioned member and driving member, an annular brake shoe surrounding said drum, means for pressing said shoe against said drum, and means for moving said drum axially.

2. A driving mechanism having in combination, a driving member, a driven shaft, said driving member having a central portion in which said driven shaft is journaled, a beveled gear rigidly and directly secured to and co-axial with said portion, an oppositely disposed beveled gear secured to said shaft, a member journaled on said first mentioned beveled gear and having a beveled pinion carried thereby meshing with both of said gears, means for connecting said last mentioned member and said driving member, said last mentioned member also being journaled on said second mentioned beveled gear, said last mentioned means comprising a plurality of annular disks between said last mentioned member and driving member, alternate ones of said disks non-revolubly engaging said driving member at one edge and the other disks non-revolubly engaging said last mentioned member at their other edges, a brake drum slidably and non-revolubly mounted on said last mentioned member adapted to compress said disks and connect said last mentioned member and driving member, and a brake shoe for holding said brake drum stationary.

3. A driving mechanism having in combination, a driving member, a driven shaft, a casing surrounding said member and shaft, said shaft having an outer end journaled in said casing and an inner end journaled in said driving member, beveled gears facing each other and carried respectively by said driving member and shaft, a revoluble member supported by said driving member and shaft and co-axial therewith, beveled pinions carried by said last mentioned member meshing with said gears, a brake drum slidably and non-revolubly mounted on said last mentioned member, a brake shoe for said drum, a clutch mechanism for connecting said driving member and last mentioned member actuated by the sliding movement of said drum, and a plurality of levers carried by said last mentioned member for engaging said drum to slide the same.

4. The structure set forth in claim 3, a block slidable on said shaft, links connecting the same and said last mentioned levers, a lever pivoted to said casing connected to said block, and means operated by said last mentioned lever for actuating said brake shoe.

5. The structure set forth in claim 3, a block slidable on said shaft, links respectively connecting said block and said levers, a cam lever pivoted on said casing having one end engaging said block for moving the same, a lever for actuating said brake shoe having means engaging said cam lever, said cam lever having three positions, one with said driving member and last mentioned member disconnected and said brake shoe disengaged, one with said driving member and last mentioned member connected with said brake shoe disengaged, and one with said driving member and last mentioned member disconnected and said brake shoe engaged.

6. A driving mechanism having in combination, a driving member, a driven member, a casing surrounding said members, co-axial facing beveled gears respectively carried by said members, a member supported on said members and revoluble about the same carrying a plurality of pinions meshing with said beveled gears, a clutch means for connecting said last mentioned member and driving member, a brake drum slidably and non-revolubly mounted on said last mentioned member for actuating said clutch means by a sliding movement, a split ring surrounding said drum hinged at one side to said casing and adjustable diametrically of said drum at its other side, a spring between the ends of said ring, a pin for pressing the ends of said ring together to grip said drum, and a common operating member for actuating said pin and sliding said drum.

7. The structure set forth in claim 6, said last mentioned member comprising a lever having a cam thereon and pivoted to said casing, a lever pivoted to said casing bearing at one end on said pin and at its other end on said cam.

In testimony whereof I affix my signature.

JOHN D. MOONEY.